(12) United States Patent
Chou

(10) Patent No.: US 12,095,565 B2
(45) Date of Patent: Sep. 17, 2024

(54) SYSTEM INFORMATION TRANSMISSION METHOD AND WIRELESS COMMUNICATION SYSTEM

(71) Applicant: Hannibal IP LLC, Frisco, TX (US)

(72) Inventor: Chie-Ming Chou, Hsinchu (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

(21) Appl. No.: 15/969,785

(22) Filed: May 3, 2018

(65) Prior Publication Data

US 2018/0323908 A1 Nov. 8, 2018

Related U.S. Application Data

(60) Provisional application No. 62/502,010, filed on May 5, 2017.

(51) Int. Cl.
| | |
|---|---|
| H04L 1/1812 | (2023.01) |
| H04L 1/1607 | (2023.01) |
| H04L 1/1867 | (2023.01) |
| H04W 48/14 | (2009.01) |
| H04W 72/04 | (2023.01) |
| H04W 74/0833 | (2024.01) |
| H04L 101/622 | (2022.01) |

(Continued)

(52) U.S. Cl.
CPC .......... *H04L 1/1812* (2013.01); *H04L 1/1671* (2013.01); *H04L 1/1887* (2013.01); *H04W 48/14* (2013.01); *H04W 72/04* (2013.01); *H04W 74/0833* (2013.01); *H04L 2101/622* (2022.05); *H04W 88/02* (2013.01); *H04W 88/08* (2013.01)

(58) Field of Classification Search
CPC . H04L 1/1812; H04L 1/18; H04L 1/16; H04L 1/12; H04L 1/1887; H04L 1/1867; H04L 1/1671; H04L 1/1607; H04L 61/6022; H04L 61/6018; H04W 48/14; H04W 48/08; H04W 48/00; H04W 72/04; H04W 72/00; H04W 74/0833; H04W 74/08; H04W 88/08; H04W 88/00; H04W 88/02
USPC ......................................................... 370/329
See application file for complete search history.

(56) References Cited

U.S. PATENT DOCUMENTS 10,200,920 B2 * 2/2019 Kubota .................. H04L 12/18
2009/0011786 A1 * 1/2009 Lee ..................... H04W 52/325
455/522

(Continued)

OTHER PUBLICATIONS

Samsung, On Demand SI: Remaining Issues R2-1707678, Aug. 3, 2021, 3GPP TSG-RAN WG2 #99 (Year: 2017).*

(Continued)

*Primary Examiner* — Jeffrey M Rutkowski
*Assistant Examiner* — Luna Weissberger
(74) *Attorney, Agent, or Firm* — Marcella M. Bodner; Cole Schotz, P.C.

(57) ABSTRACT

A system information transmission method is provided. The system information transmission method includes the following steps. A first preamble for system information request is transmitted by a UE to a base station. When an acknowledgement message from the base station is not received, the first preamble for system information request is retransmitted by the UE to the base station. When the acknowledgement message from the base station is received, system information is received by the UE from the base station.

17 Claims, 10 Drawing Sheets

(51) Int. Cl.
*H04W 88/02* (2009.01)
*H04W 88/08* (2009.01)

(56) References Cited

U.S. PATENT DOCUMENTS

| | | | | |
|---|---|---|---|---|
| 2013/0201960 A1* | 8/2013 | Kim | ................... | H04L 1/1861 |
| | | | | 370/331 |
| 2016/0135143 A1* | 5/2016 | Won | ................... | H04W 12/08 |
| | | | | 370/312 |
| 2017/0251500 A1* | 8/2017 | Agiwal | ............. | H04W 72/0413 |
| 2018/0049243 A1* | 2/2018 | Lee | ................... | H04W 74/0833 |
| 2018/0084578 A1* | 3/2018 | Kato | ................... | H04W 4/70 |
| 2018/0270866 A1* | 9/2018 | Loehr | ................... | H04L 1/188 |
| 2018/0279186 A1* | 9/2018 | Park | ................... | H04W 36/302 |
| 2018/0279375 A1* | 9/2018 | Jeon | ................... | H04W 72/23 |
| 2018/0288683 A1* | 10/2018 | Bendlin | ................ | H04W 48/14 |
| 2019/0037479 A1* | 1/2019 | Suzuki | ................. | H04W 76/27 |
| 2019/0053131 A1* | 2/2019 | Suzuki | .................... | H04W 8/24 |
| 2019/0069220 A1* | 2/2019 | Kim | ..................... | H04W 48/14 |
| 2019/0074936 A1* | 3/2019 | Lee | ........................ | H04L 5/0055 |
| 2019/0074953 A1* | 3/2019 | Tooher | ................. | H04L 5/0035 |
| 2019/0166622 A1* | 5/2019 | Kim | ................... | H04W 74/006 |
| 2019/0174554 A1* | 6/2019 | Deenoo | ................ | H04L 5/0048 |
| 2019/0327030 A1* | 10/2019 | Yoshimoto | ........... | H04L 1/0061 |
| 2021/0136823 A1* | 5/2021 | Kim | ................. | H04W 74/0891 |

OTHER PUBLICATIONS

OPPO, Discussion on Remaining Issues of On-Demand SI R2-1707765, Aug. 10, 2021, 3GPP TSG-RAN WG2 #99 (Year: 2017).*

Intel Corporation, Msg3 vs. Msg1 for on-demand SI request, Feb. 13-17, 2017, 3GPP TSG-RAN WG2 Meeting #97 R2-1701737 (Year: 2017).*

Intel Corporation, R2-1701737 Msg3 vs. Msg1 for on-demand SI request, Greece, Feb. 13-17, 2017 (Year: 2017).*

* cited by examiner

SYSTEM INFORMATION TRANSMISSION METHOD AND WIRELESS COMMUNICATION SYSTEM

CROSS REFERENCE

This application claims the benefit and priority to of U.S. Provisional Application Ser. No. 62/502,010, filed on May 5, 2017, and entitled "Method and apparatus for on-demand system information delivery", which is incorporated herein by reference in its entirety.

TECHNICAL FIELD

The present disclosure generally relates to system information transmission method and wireless communication system.

BACKGROUND

In fourth generation (4G) wireless communication systems (e.g., long term evolution (LTE)), system information (SI) sent to the user equipment (UE) includes various parameters of both the Access Stratum (AS) and Non Access Stratum (NAS). These parameters are common for all UEs connected to the same cell and are broadcasted periodically. UEs use the SI for multiple purposes, for example, system access and other idle mode procedures like cell selection, reselection, etc. In LTE system, the SI includes Master Information Block, System Information Block1, System Information Block2 and System Information Blocks 3 to 8. UE reads the SI during the initial attach process. Once UE is camped to a new cell, it reads the relevant SI. If some SI value is changed, the network informs the UE that SI is changed by paging process. And then, UE will read the SI during the next modification cycle. Once the UE receives a paging indicating SIB modification, it will invalidate all SI and retrieve all SI again.

In NR system, SI could be categorized into minimum SI and other SI. The minimum SI shall be broadcasted periodically and the content of the minimum SI shall at least include information to support cell selection, for acquiring other SI, for accessing the cell. However, the transmission mechanisms for other SI shall be further studied.

SUMMARY

In one aspect of the present disclosure, a system information transmission method is provided. The system information transmission method includes the following steps. A first preamble for system information request is transmitted by a UE to a base station. When an acknowledgement message from the base station is not received, the first preamble for system information request is retransmitted by the UE to the base station. When the acknowledgement message from the base station is received, the requested system information is received by the UE from the base station.

In another aspect of the present disclosure, a UE is provided. The UE includes a processor configured to perform the following instructions. A first preamble for system information request is transmitted to a base station. When an acknowledgement message from the base station is not received, the first preamble for system information request is retransmitted to the base station. When the acknowledgement message from the base station is received, the requested system information is received from the base station.

In yet another aspect of the present disclosure, a base station is provided. The base station includes a processor configured to perform the following instructions. A system information request is received from a UE. When the system information request included in a first preamble for system information request is received, an acknowledgement message is transmitted to the UE. The system information is transmitted to the UE.

In yet another aspect of the present disclosure, a system information transmission method is provided. The system information transmission method includes the following steps. A system information request is received by a base station from a UE. When the system information request included in a first preamble for system information request is received by the base station, an acknowledgement message is transmitted by the base station to the UE. The system information is transmitted by the base station to the UE.

DETAILED DESCRIPTION

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

Figure 1:
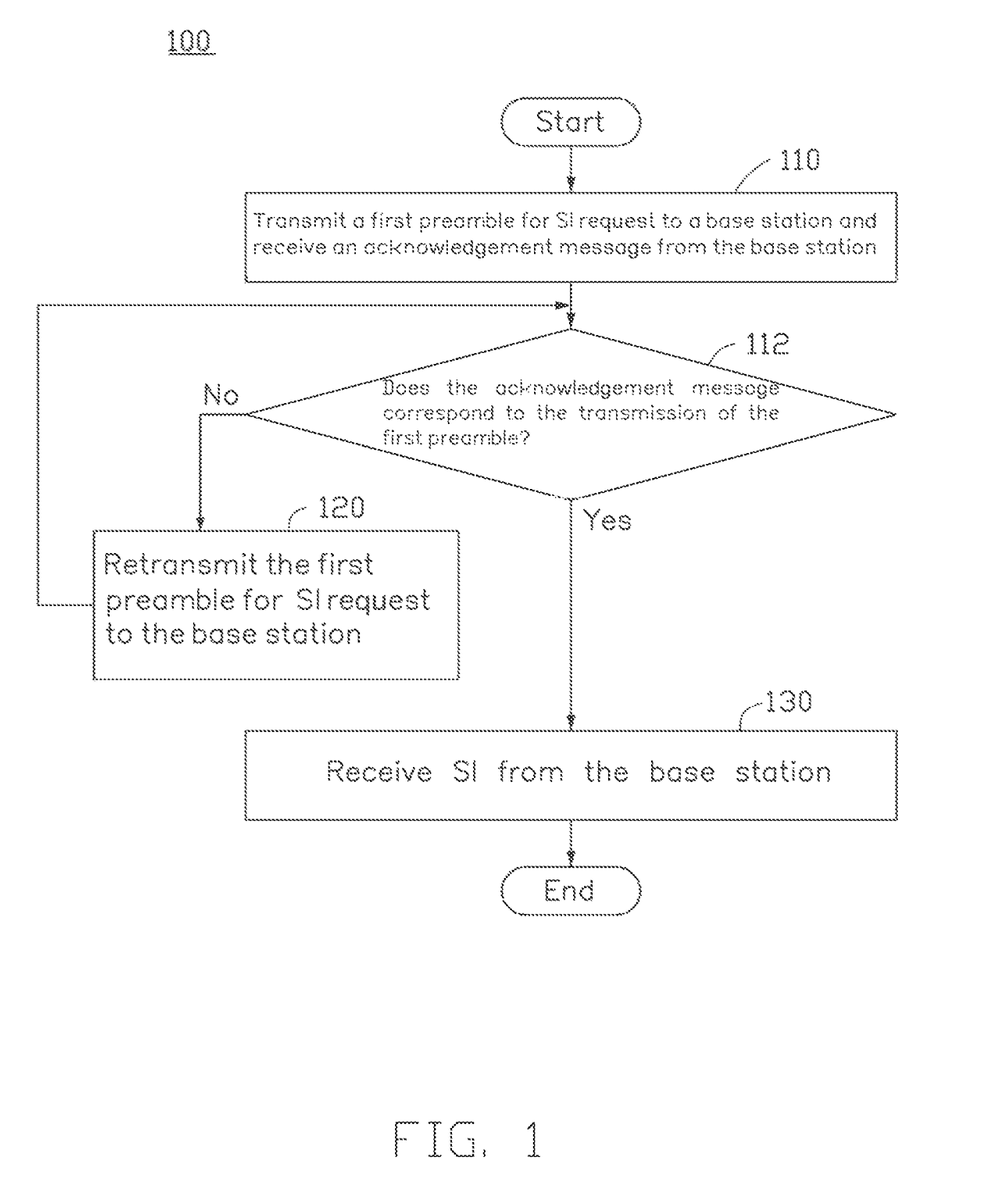
FIG. 1 is a flowchart of SI transmission method of a UE according to an exemplary implementation of the present disclosure.

FIG. 1 is a flowchart of SI transmission method of a UE according to an exemplary implementation of the present disclosure. As shown in block 110, the UE transmits a first preamble for SI request to a base station. In block 112, the UE determines whether the transmission of the first preamble for SI request is successful in response to the reception of the acknowledgement message. In one implementation, the acknowledgement message corresponds to the first preamble for SI request and indicates that the first preamble for SI request is received successfully by the base station. When the acknowledgement message is not received, the transmission of the first preamble for SI request is considered not successful. In this case, the UE retransmits the first preamble for SI request to the base station as shown in block 120. When the acknowledgement message is received, the transmission of the first preamble for SI request is considered successful. The UE waits for receiving the SI from the base station as shown in block 130.

In one implementation, the requested SI is also known as, e.g., other SI, or on-demand SI. In some implementations, the requested SI may include, but is not limited to, System Information Block2 (SIB2) and System Information Blocks 3 to 8. For example, SIB2 includes information about common and shared channels, e.g., RACH, PRACH, BCCH, PDSCH, and PUSCH. System Information Block 3 to 8 includes information required for cell reselection. SIB3 includes information about intra-frequency cell reselection except neighbor cell information. SIB4 includes information about neighbor cell information. SIB5 includes information about inter-frequency cell reselection. SIB6 includes information about UTRAN. SIB7 includes information about GERAN. SIB8 includes information about CDMA related cell reselection.

Figure 2:
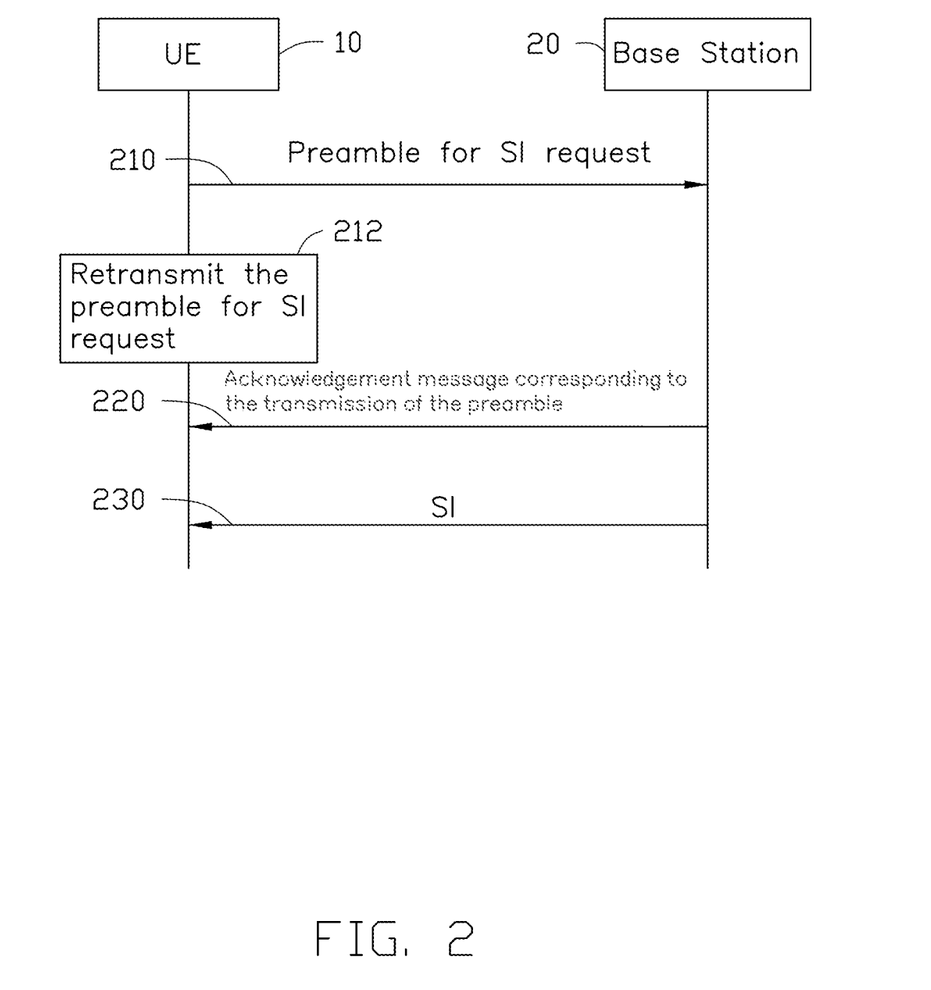
FIG. 2 is a schematic diagram of SI transmission method of a wireless communication system, according to an implementation of the present disclosure.

FIG. 2 is a schematic diagram of SI transmission method of a wireless communication system, according to an implementation of the present disclosure. In this implementation, the wireless communication system includes at least one user equipment (e.g., UE 10) and at least one base stations (e.g., base station 20). The UE (e.g., UE 10) communicates with the network (e.g., a core network) via at least one of the base station (e.g., base station 20). In the present disclosure, a UE may include, but is not limited to, a mobile device, a portable radio equipment, or a wireless communication device. For example, the UE includes, but is not limited to, a mobile phone, a tablet, a wearable device, a laptop, or a personal digital assistant (PDA) with wireless communication capability. The UE is configured to receive and transmit signals to one or more base station in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-AN, and any other apparatus capable of controlling radio communication and managing radio resources within a cell. The base station may be configured to provide communication services to serve the one or more UEs through the radio access network.

The UE or the base station may include e, but is not limited to, transceiver, processor, memory, and a variety of computer-readable media. Transceiver having transmitter and receiver configured to transmit and/or receive data. Processor may include an intelligent hardware device, e.g., a central processing unit (CPU), a microcontroller, an ASIC, and etc. Processor may process data and instructions. Memory may include volatile and/or non-volatile memory. Memory may be removable, non-removable, or a combination thereof. Exemplary memory includes solid-state memory, hard drives, optical-disc drives, and etc. Memory may store computer-readable, computer-executable instructions (e.g., software codes) that are configured to cause processor to perform various functions. Computer-readable media can be any available media that can be accessed and include both volatile and non-volatile media, removable and non-removable media. By way of example, and not limitation, computer-readable media may comprise computer storage media and communication media. Computer storage media stores information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices.

As shown in FIG. 2, in action 210, the UE transmits the preamble for SI request to the base station 20. In one implementation, the first preamble for SI request (i.e., MSG1 of the random access procedure) is transmitted. When the base station receives the preamble for SI request, in action 220, the base station 20 transmits an acknowledgement message to the UE 10. In one implementation, the acknowledgement message is transmitted during MSG2 transmission. For example, the acknowledgement message is a random access response (RAR) including only cell radio network temporary identifier (C-RNTI), or an RAR without grant and without timing adjustment value. In another example, the acknowledgement message is a MAC subheader including only random access preamble identifier (RAPID) without any payload, or a MAC subheader without grant and without timing adjustment value.

However, during the MSG2 transmission, if an RAR with grant or timing adjustment value is received, or an RAPID with the payload is received, or any grant and timing adjustment value is received, by the UE, the UE decides that this message does not correspond to the first preamble for SI request, and then the UE retransmits the first preamble for SI request. In one implementation, the UE retransmits the preamble for SI request, in action 212, when the acknowledgement message does not correspond to the preamble for SI request although the acknowledgement message is received. For example, there might be multiple SI request (preamble for SI request) sent to the base station, and therefore the UE may check whether the received acknowledgement message corresponds to the requested preamble for SI request. The UE retransmits the first preamble for SI request when the acknowledgement message does not correspond to the preamble for SI request.

After transmitting the acknowledgement message, in action 230, the base station 20 transmits the SI to the UE10. In one implementation, the base station 20 broadcast the SI in a pre-defined SI window. For example, the base station 20 may broadcast the SI when the base station 20 identifies that there are multiple SI requests at the same time (e.g., strong transmission power is detected within MSG1 transmission due to requests from multiple UEs at the same resource). In this case, after the UE receives acknowledgement message, the UE may monitor the broadcasted SI in the next SI window. In another implementation, the SI is transmitted via a unicast message configured by the base station 20.

Figure 3:
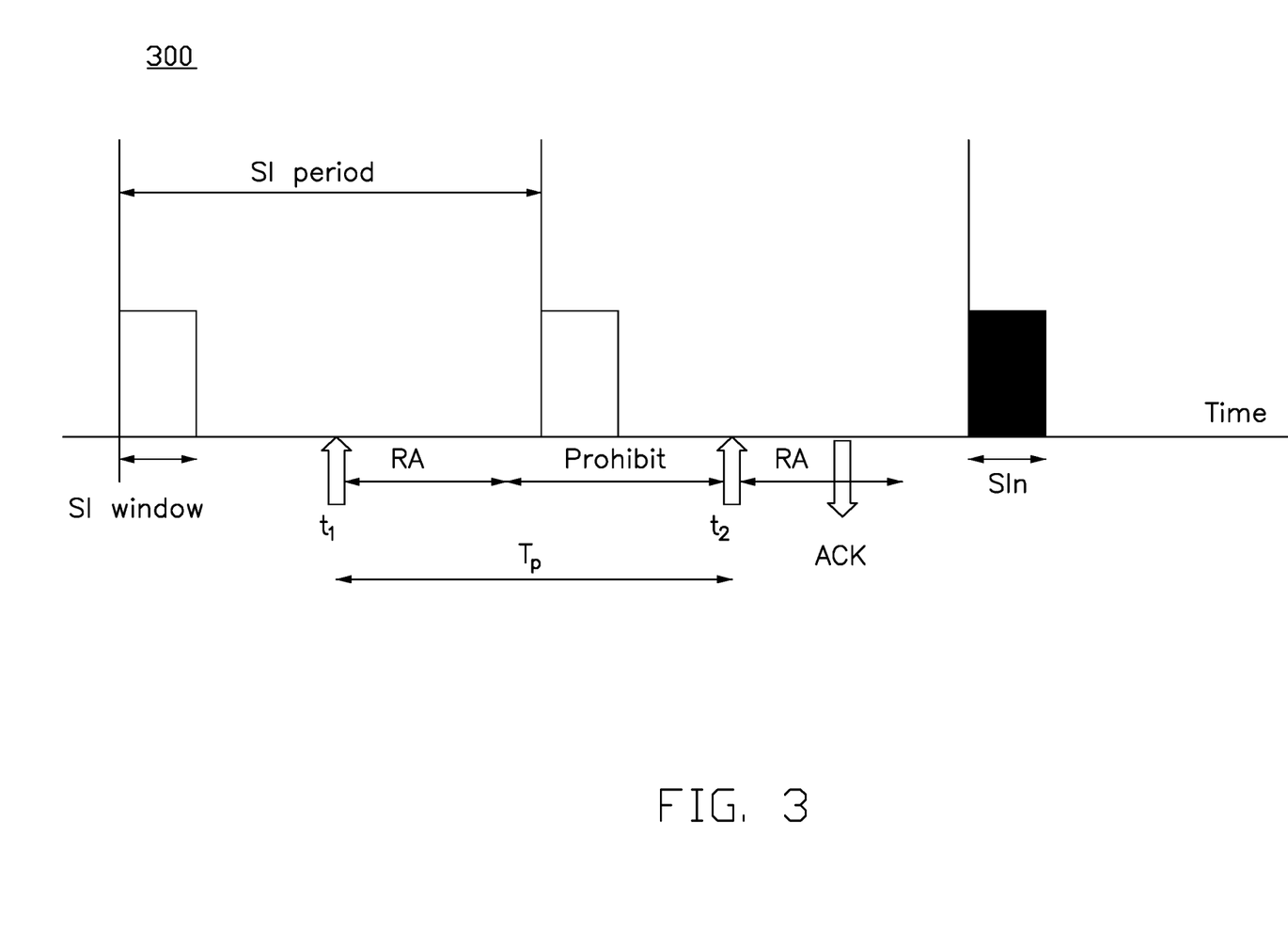
FIG. 3 is a timing diagram 300 of SI transmission method of a wireless communication system, according to an implementation of the present disclosure.

FIG. 3 is a timing diagram 300 of SI transmission method of a wireless communication system, according to an implementation of the present disclosure. In this implementation, the UE includes a timer. As shown in FIG. 3, the UE transmits the first preamble for SI request at $t_1$, and the timer starts at $t_1$. In the random access window "RA" (e.g., MSG2 transmission period), the UE waits for the acknowledgement message. And after the "RA" window, the UE is prohibited to transmit the first preamble for SI request (e.g., MSG1 transmission) for a period of time (e.g., "prohibit" as shown in FIG. 3). When the timer expires (e.g., after $T_p$), the UE retransmits the first preamble for SI request at $t_2$. On the other hand, when the acknowledgement message (e.g., "ACK" as shown in FIG. 3) is received by the UE, the UE monitors the next SI window (e.g., "SIn" as shown in FIG. 3) for receiving the SI. In one implementation, the timer $T_p$ is set according to SI window. For example, the UE monitors whether the requested SI is received in the SI window, and the UE retransmits the preamble after the SI window (i.e., $T_p$ expired) without any requested SI received.

In another implementation, there is no prohibit time configuration for the UE (e.g., "prohibit" period=0, or "$T_p$" period="RA" period) so that the UE retransmits the first preamble for SI request immediately after the RA window. The timer value (e.g., T1) could be an absolute time unit or SI period unit. In some implementations, it is possible to have a random back-off mechanism for the timer. In some other implementations, the prohibition is per SI request that UE may transmit another preamble for another SI request when the timer is running.

Figure 4:
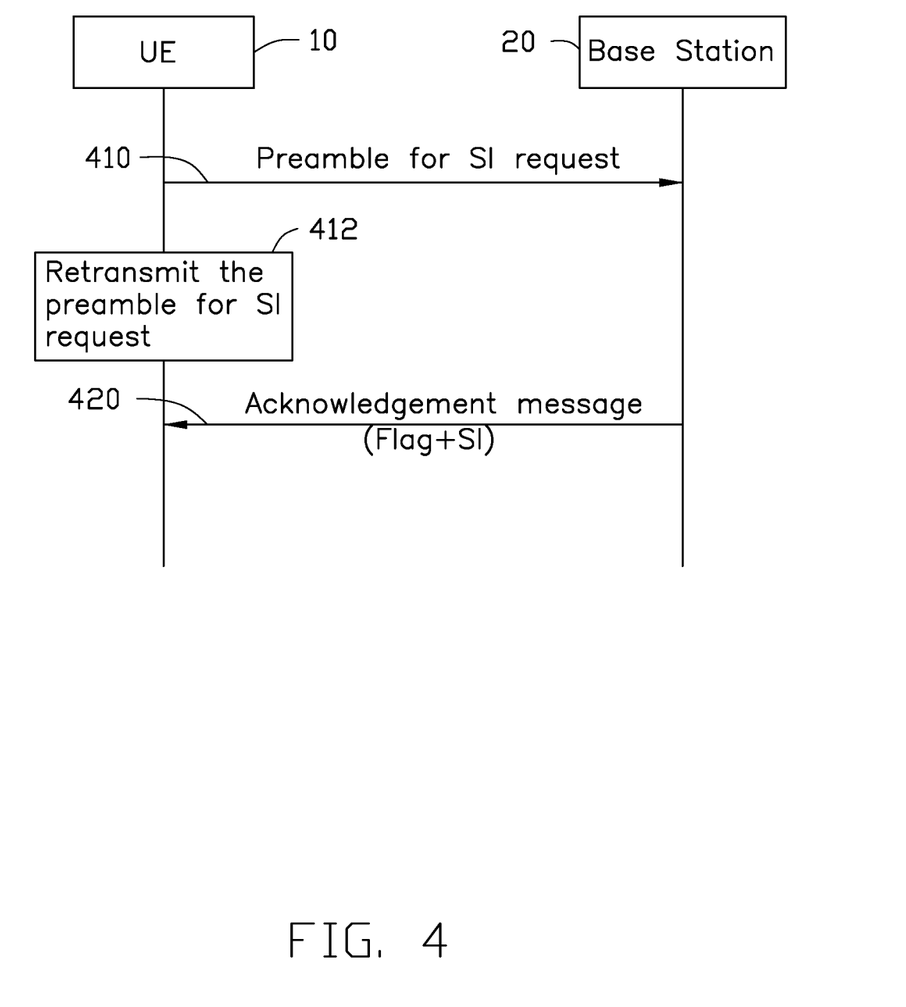
FIG. 4 is a schematic diagram of SI transmission method of a wireless communication system, according to an implementation of the present disclosure.

FIG. 4 is a schematic diagram of SI transmission method of a wireless communication system, according to an implementation of the present disclosure. In action 410, the UE transmits the preamble for SI request to the base station 20. In one implementation, the UE retransmits the preamble for SI request, in action 412, when the acknowledgement message corresponding to the preamble for SI request is not received.

In action 420, the base station 20 transmits an acknowledgement message to the UE 10. In this implementation, the acknowledgement message includes a flag and SI. For example, the base station decides whether it is feasible to piggyback the requested SI during the MSG2 transmission in response to the preamble for SI request (e.g., the size of the requested SI). For instance, when the size of the requested SI is not greater than the size of the payload of MSG2 transmission, the base station decides to piggyback the requested SI within the payload of the MSG2 transmission. When the SI included the acknowledgement message is transmitted during MSG2 transmission, a flag indicating that the SI is appended is also included in the acknowledgement message. For instance, the flag in the acknowledgement message indicates that the content of SI is in the payload of the acknowledgement message. When the UE receives the acknowledgement message with a flag indicating that the SI is appended (e.g., flag bit "1"), the UE identifies that the SI reception is accomplished in the same message.

In one implementation, different preamble for SI requests may be used for respective SI, and the corresponding preamble is reserved or configured by the base station. In another implementation, the size of the MSG2 transmission is fixed and only some specific SI may be appended within the acknowledgement message.

Figure 5:
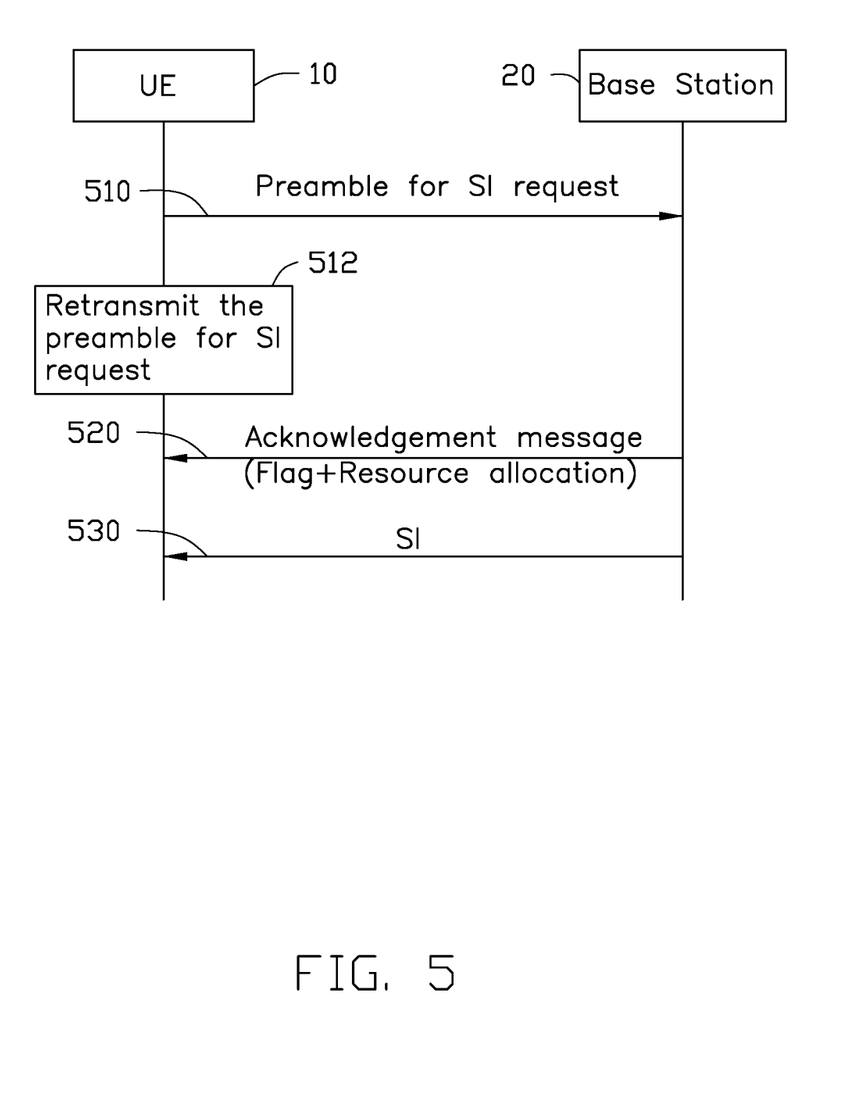
FIG. 5 is a schematic diagram of SI transmission method of a wireless communication system, according to an implementation of the present disclosure.

FIG. 5 is a schematic diagram of SI transmission method of a wireless communication system, according to an implementation of the present disclosure. In action 510, the UE transmits the preamble for SI request to the base station 20. In one implementation, the UE retransmits the preamble for SI request, in action 512, when the acknowledgement message corresponding to the preamble for SI request is not received.

In action 520, the base station 20 transmits an acknowledgement message to the UE 10. In this implementation, the acknowledgement message includes a flag and resource allocation. For example, when the base station decides that it is not feasible to piggyback the requested SI during the MSG2 transmission, a resource allocation is provided in the acknowledgement message during MSG2 transmission, and a flag indicating that the SI is not appended is also included in the acknowledgement message. When the UE receives the acknowledgement message with a resource allocation and a flag indicating that the SI is not appended (e.g., flag bit "0"), the UE follows the granted resource allocation to receives the SI. In one implementation, the resource allocation may be a downlink resource for mini-slot configuration, which comprises time, frequency, or modulation and coding schemes (MCS) allocation for the SI transmission.

Figure 6:
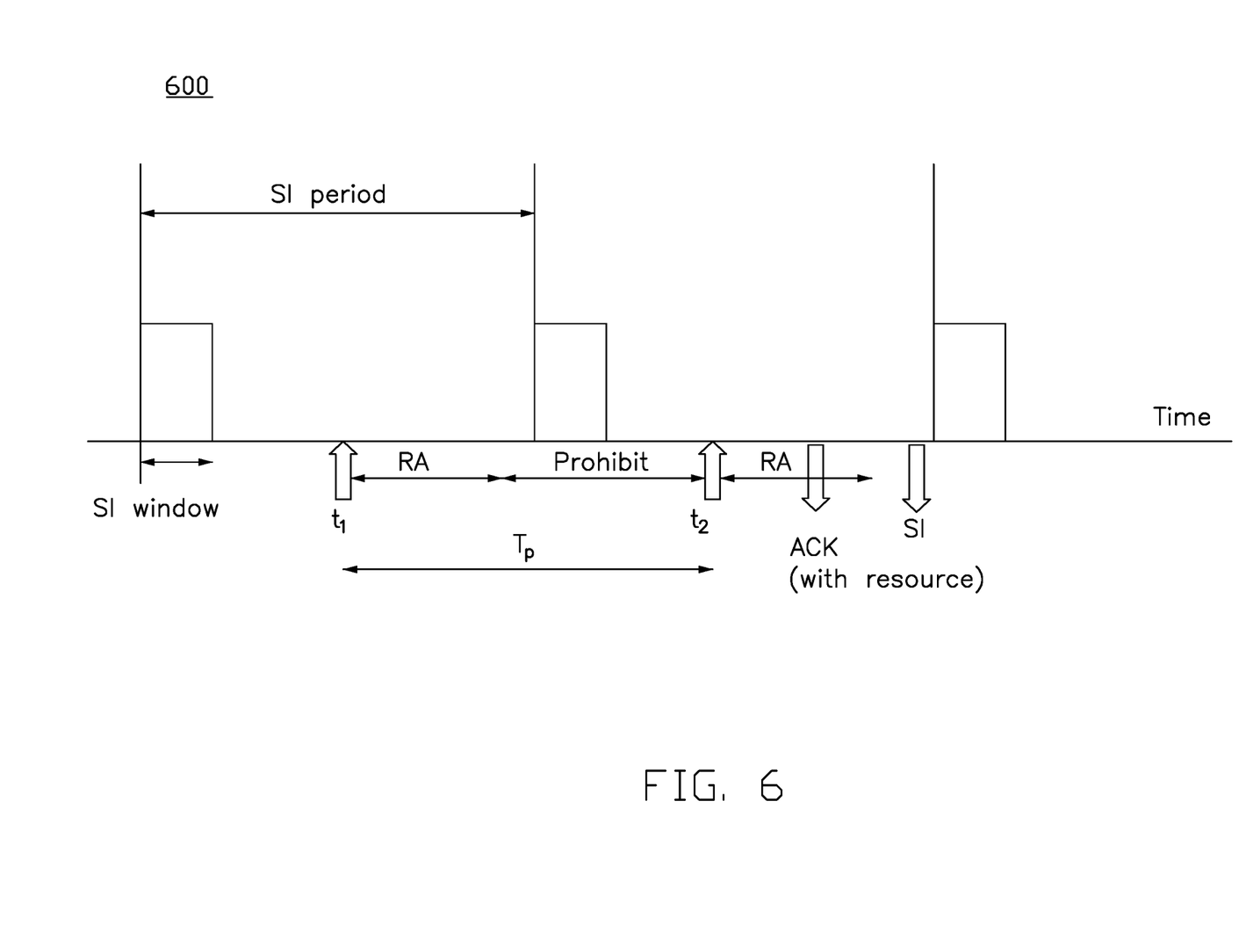
FIG. 6 is a timing diagram 600 of SI transmission method of a wireless communication system, according to an implementation of the present disclosure.

FIG. 6 is a timing diagram 600 of SI transmission method of a wireless communication system, according to an implementation of the present disclosure. In this implementation, when the acknowledgement message with a resource allocation (e.g., "ACK (with resource)") is received by the UE, the UE follows the granted resource allocation to receives the SI.

Figure 7:
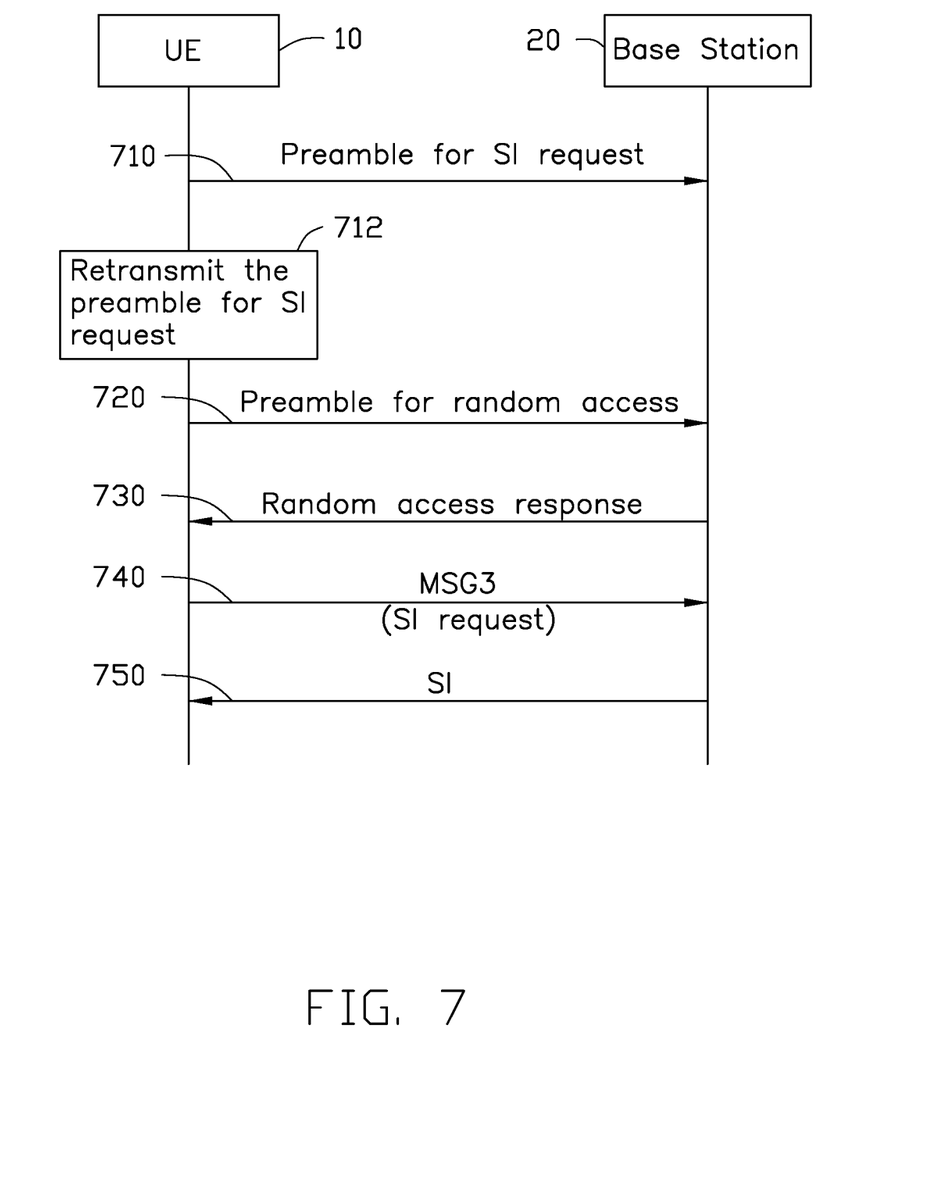
FIG. 7 is a schematic diagram of SI transmission method of a wireless communication system, according to an implementation of the present disclosure.

FIG. 7 is a schematic diagram of SI transmission method of a wireless communication system, according to an implementation of the present disclosure. In action 710, the UE transmits the preamble for SI request to the base station 20. In one implementation, the UE retransmits the preamble for SI request, in action 712, when the acknowledgement message corresponding to the preamble for SI request is not received.

In this implementation, the UE 10 includes a counter configured for counting a number of retransmitting the preamble for SI request. When the number of retransmitting the preamble for SI request exceeds a pre-determined threshold, in action 720, the UE 10 transmits a preamble for random access to the base station 20 to proceed a contention-based RA procedure. In action 730, the base station 20 transmits the random access response to the UE 10. When the UE 10 receives the random access response from the base station 20, in action 740, the UE append the SI request within the MSG3 transmission. In action 750, the base station 20 transmits the SI to the UE10. In one implementation, the base station 20 broadcasts the SI in a pre-defined SI window. In another implementation, the SI is transmitted via a unicast message configured by the base station 20.

Figure 8A:
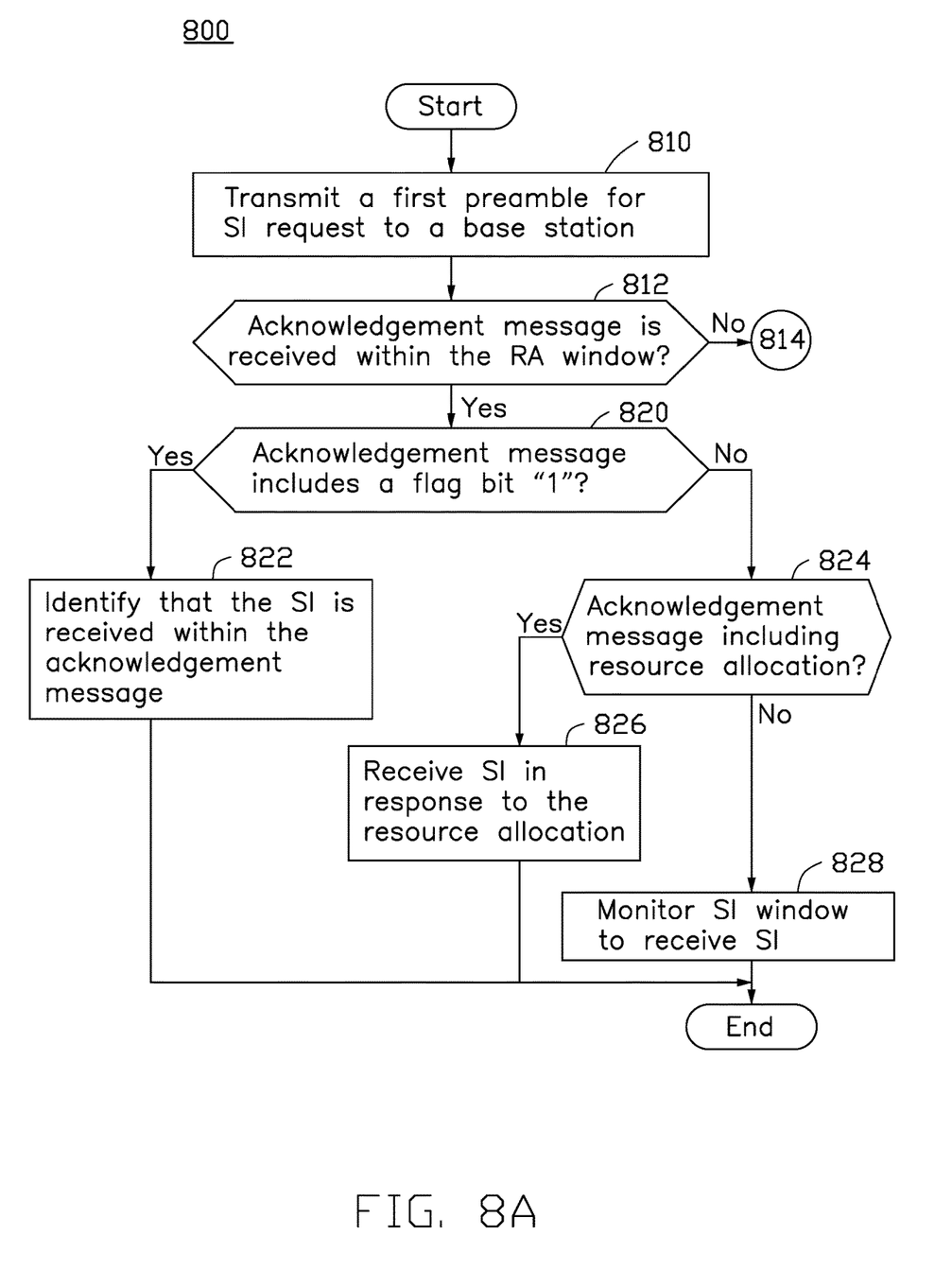
FIGS. 8A and 8B are flowcharts of SI transmission method of a wireless communication system, according to an implementation of the present disclosure.
Figure 8B:
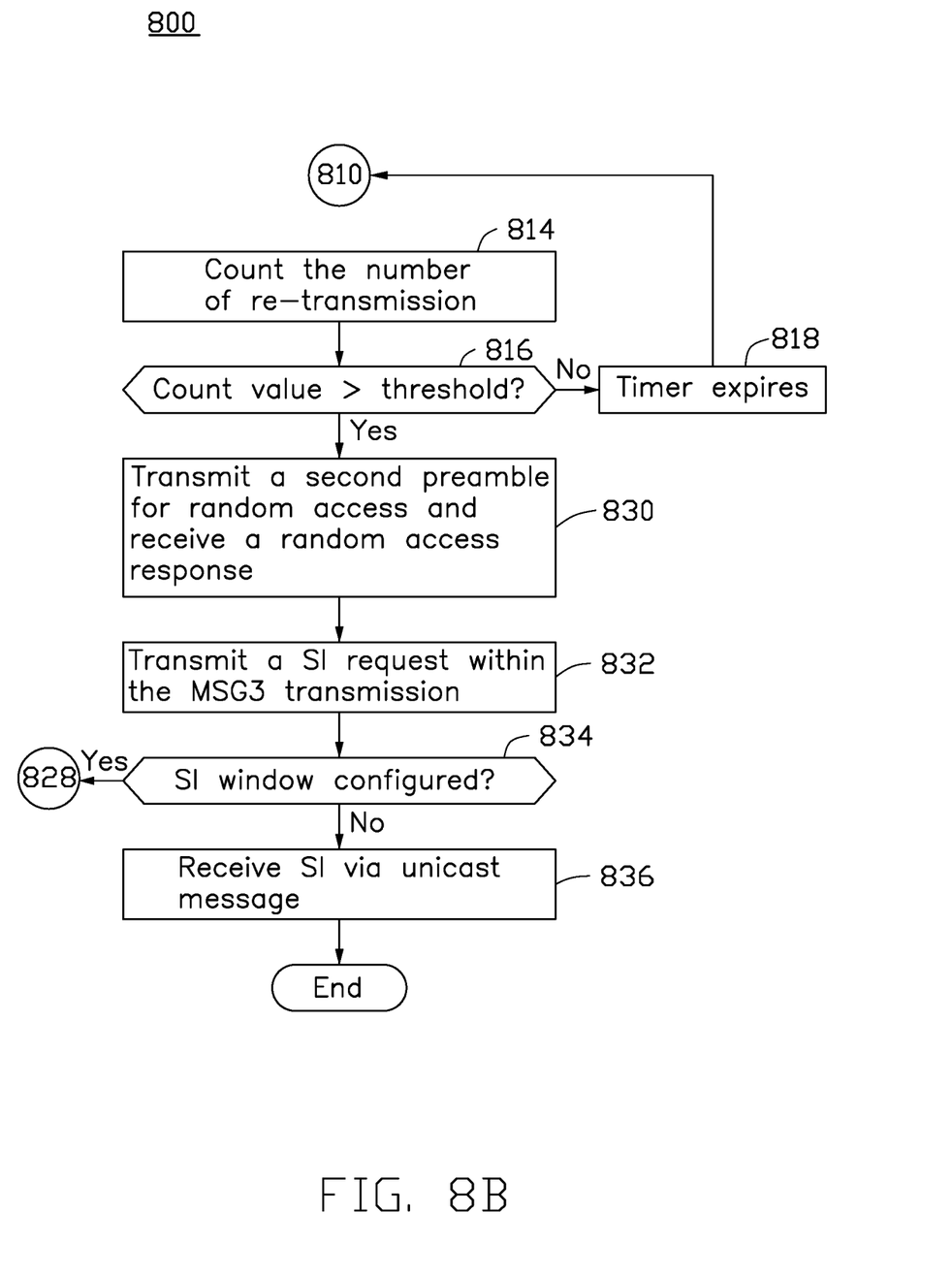

FIGS. 8A and 8B are flowcharts of SI transmission method of a wireless communication system, according to an implementation of the present disclosure. The SI transmission method 800 includes the following steps. In block 810, a UE transmits a first preamble for SI request to a base station. In block 812, the UE determines whether the acknowledgement message is received within the RA window. If the answer is yes, the UE determines whether the acknowledgement message includes a flag bit "1" as shown in block 820. When the acknowledgement message includes a flag bit "1", the UE identifies that the SI is received within the acknowledgement message.

On the other hand, when the acknowledgement message includes a flag bit "0", the UE identifies whether a resource allocation is included in the acknowledgement message in block 824. When the resource allocation is included in the acknowledgement message, the UE receives SI in response to the resource allocation. Alternatively, when the resource allocation is not included in the acknowledgement message, the UE monitors SI window to receive SI in block 828.

In some implementations, the UE includes a counter. When the acknowledgement message is not received in block 812, the counter of the UE counts the number of retransmission in block 814. In block 816, the UE determines whether the count value exceeds a pre-determined threshold. If not, when the timer of the expires in block 818, the UE retransmits the first preamble for SI request to the base station. However, if the count value exceeds the pre-determined threshold, the UE transmits a second preamble for random access instead of the first preamble for SI request to the base station and receives a random access response as shown in block 830. After the random access response is received, in block 832, the UE transmits a SI request within the MSG3 transmission. In block 834, the UE identifies whether the SI window is configured. If the SI window is configured, the UE monitors SI window to receive SI as shown in block 828. If the SI window is not configured, the UE receives SI via unicast message.

Figure 9:
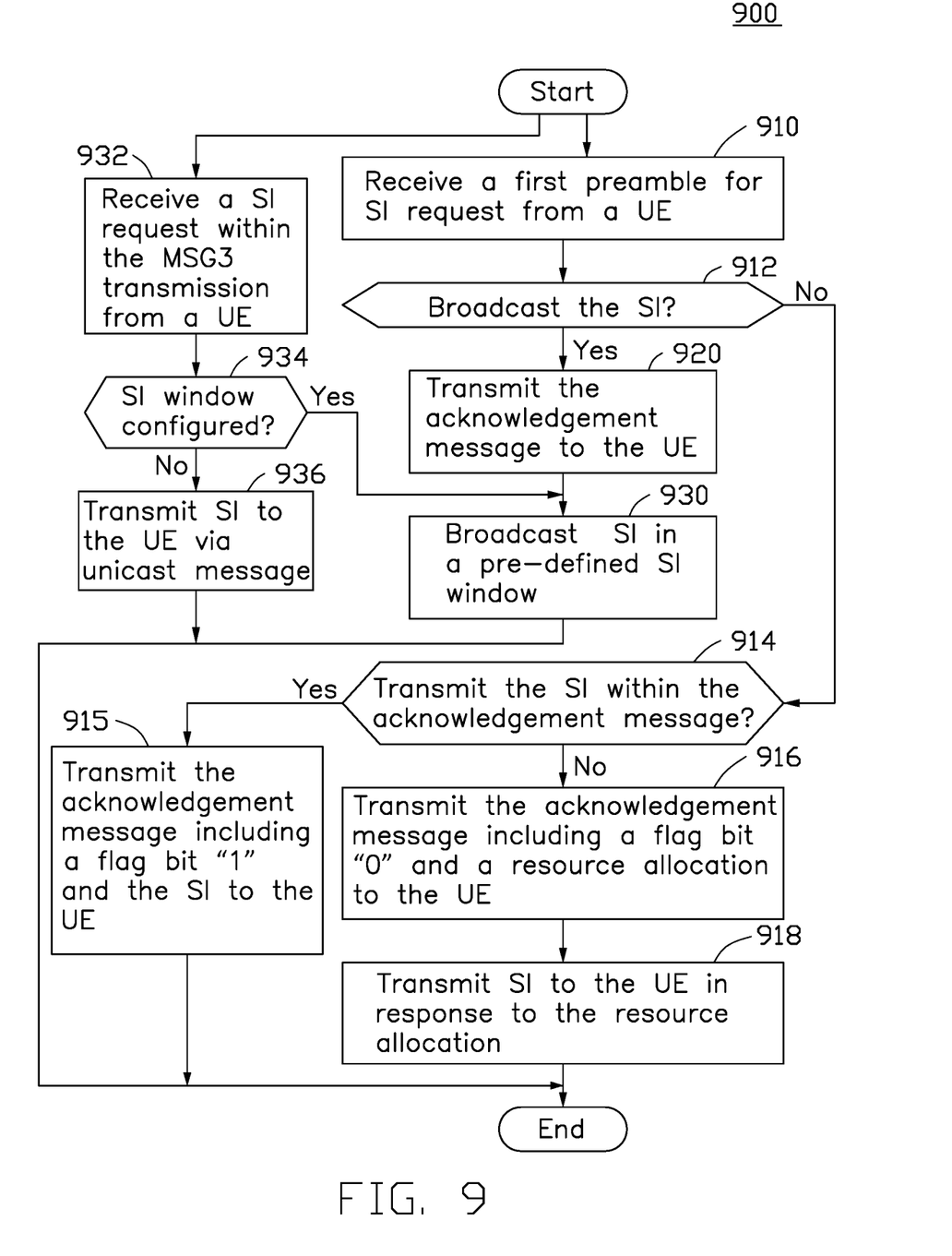
FIG. 9 is a flowchart of SI transmission method of a wireless communication system, according to an implementation of the present disclosure.

FIG. 9 is a flowchart of SI transmission method of a wireless communication system, according to an implementation of the present disclosure. The SI transmission method 900 includes the following steps. Firstly, a base station receives a SI request from a UE. For example, as shown in block 910, the base station receives a first preamble for SI request from the UE. In another example, as shown in block 910, the base station receives a SI request within the MSG3 transmission from the UE. When the SI request included in a first preamble for SI request is received, the base station transmits the acknowledgement message to the UE as shown in block 920. And then the base station transmits SI to the UE.

In one implementation, in block 912, the base station decides whether to broadcast the SI. When base station decides to broadcast the SI, in block 920, the base station transmits the acknowledgement message including a flag bit "0" indicating that the SI is not appended to the UE. In block 930, the base station broadcasts SI in a pre-defined SI window. In another case, when base station decides not to broadcast the SI, the base station further decides whether to transmit the SI within the acknowledgement message. For example, the base station decides whether to transmit the SI within the acknowledgement message in response to the preamble for SI request (the size of the requested SI).

When the base station decides to transmit the SI within the acknowledgement message, the base station transmits the acknowledgement message including a flag bit "1" (i.e., indicating that the SI is not appended) and the SI to the UE in block 915. On the contrary, when the base station decides not to transmit the SI within the acknowledgement message, the base station transmits the acknowledgement message including a flag bit "0" (indicating that the SI is not appended) and a resource allocation to the UE in block 916. In block 918, the base station transmits SI to the UE in response to the resource allocation.

On the other hand, in some implementation, the base station does not receive the first preamble for SI request from the UE. Instead, the base station receives a second preamble for random access from the UE, and transmits a random access response to the UE. And then after the random access response is transmitted, the base station receives a SI request within the MSG3 transmission from the UE as shown in block 932. In block 934, the base station determines that whether the SI window is configured for the UE. When the SI window is configured, in block 930, the base station broadcasts SI in a pre-defined SI window. When the SI window is not configured, in block 936, the base station transmits SI via a unicast message.

Based on the above, several SI transmission methods and wireless communications with error handling mechanism are provided in this disclosure. A preamble for SI request is transmitted, and an acknowledgement message is received during the MSG2 transmission for identifying whether the preamble for SI request is received successfully. And the preamble for SI request is retransmitted when an acknowledgement message from the base station is not received. Furthermore, the UE could append the SI request within the MSG3 transmission when a random access response is received during the MSG2 transmission. In some implementations, a timer is used for retransmitting the first preamble for system information request to the base station when the timer expires. Also, a counter may be used to count the number of retransmission, and the UE append the SI request within the MSG3 transmission when the number exceeds a threshold. Moreover, the base station could broadcast the SI. In another implementation, the base station could append the SI within the acknowledgement message during the MSG2 transmission. In some other implementations, the base station could transmit SI via a unicast message.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A system information communication method performed by a user equipment (UE), comprising:
   receiving a resource allocation from a base station (BS) for acquiring a first system information (SI) and a second SI, the first SI being different from the second SI;
   transmitting a first preamble (MSG1) to the BS;
   receiving a first response message (MSG2) from the BS;
   determining whether the first MSG2 corresponds to the first MSG1;
      wherein the first MSG2 is determined to correspond to the first MSG1 when the first MSG2 includes one of at least:
         a medium access control (MAC) subheader including only a random access preamble identifier without any payload, and
         a MAC subheader without grant and without a timing adjustment value;
   transmitting a second preamble (MSG3) for acquiring the first SI within MSG3 transmission;
   determining whether to receive the first SI via one of unicast transmission and broadcast transmission based on whether the resource allocation indicates that a first SI window is configured for the first SI;
   in response to determining that first SI window is configured for the first SI, receiving the first SI as a broadcast message during the first SI window;
   in response to determining that a first SI window is not configured for the first SI:
      receiving the first SI as a unicast message according to the resource allocation in response to determining that the first MSG2 corresponds to the first MSG1; and retransmitting the first MSG1 to the BS after a timing window in response to determining that the first MSG2 does not correspond to the first MSG1, the timing window comprising a random access (RA) window and a timer for the UE.

2. The system information communication method of claim 1, wherein the resource allocation is further for indicating a pre-determined threshold value for a counter, the method further comprising:
when the number of retransmissions exceeds the threshold value and the first MSG2 does not correspond to the first MSG1:
transmitting another first MSG1 for random access to the BS; and
receiving, by the UE, another first MSG2.

3. The system information communication method of claim 1, further comprising:
receiving, by the UE, system information requested by the first MSG1 from the BS in a pre-defined window.

4. The system information communication method of claim 1, wherein the first MSG2 is determined to not correspond to the first MSG1 when the first MSG2 includes at least one of an uplink (UL) grant and a timing adjustment value.

5. The system information communication method of claim 1, wherein the timer comprises one of an absolute time unit and SI period unit.

6. The system information communication method of claim 1, further comprising, when the resource allocation indicates that a second SI window is not configured for the second SI:
transmitting the second MSG 1 for the second SI to the BS;
receiving a second MSG2 from the BS;
determining whether the second MSG2 corresponds to the second MSG1; and
receiving the second SI as a unicast message according to the resource allocation in response to determining that the second MSG2 corresponds to the second MSG1.

7. The system information communication method of claim 1, wherein the resource allocation is further for indicating a message resource for receiving the first SI, and
receiving the first SI based on the message resource.

8. The system information communication method of claim 1, wherein the first MSG2 is determined to correspond to the transmission of the first MSG1 when the first MSG2 corresponds to the first MSG1 for the first SI request and indicates that the first MSG1 for the first SI request is received successfully by the base station.

9. A user equipment (UE), comprising:
a transceiver for sending and receiving data;
a processor coupled to the transceiver; and
a non-transitory machine-readable medium, coupled to the processor, for storing computer executable instructions, the computer-executable instructions causing the processor to:
receive, via the transceiver, a resource allocation from a base station (BS) for requesting a first system information (SI) and a second SI request, the first SI being different from the second SI;
transmit a first preamble (MSG1) to the BS;
receive a first response message (MSG2) from the BS;
determine whether the first MSG2 corresponds to the first MSG1;
wherein the first MSG2 is determined to correspond to the first MSG1 when the first MSG2 includes one of at least:
a medium access control (MAC) subheader including only a random access preamble identifier without any payload, and
a MAC subheader without grant and without a timing adjustment value;
transmit a second preamble (MSG3) for acquiring the first SI with MSG3 transmission;
determine whether to receive the first SI via one of broadcast transmission and unicast transmission based on whether the resource allocation indicates that a first SI window is configured for the first SI;
in response determining that the first SI window is configured for the first SI,
receive, via the transceiver, the first SI in a broadcast message during the first SI window;
in response to determining that a first SI window is not configured for the first SI:
receive, via the transceiver, the first SI as a unicast message according to the resource allocation in response to determining that the first MSG2 corresponds to the first MSG1; and
retransmit, via the transceiver, the first MSG1 to the BS after a timing window in response to determining that the first MSG2 does not correspond to the first MSG1, the timing window comprising a random access (RA) window and a timer for the UE.

10. The UE of claim 9, wherein:
the timing window starts when the first MSG1 is transmitted.

11. The UE of claim 9, wherein the resource allocation is further for indicating a pre-determined threshold value for a counter, the computer-executable instructions further causing the processor to, when the number of retransmissions of the first MSG1 exceeds the threshold value and the first MSG2 does not correspond to the transmission of the first MSG1:
transmit, via the transceiver, another first MSG1 for random access to the BS; and
receive, via the transceiver, another first MSG2.

12. The UE of claim 9, wherein the computer-executable instructions further cause the processor to:
receive, via the transceiver, system information requested by the first MSG1 from the BS in a pre-defined window.

13. The UE of claim 9, wherein the MSG2 is determined to not correspond to the first MSG1 when the first MSG2 includes at least one of an uplink (UL) grant and a timing adjustment value.

14. The UE of claim 9, wherein the timer comprises one of an absolute time unit and SI period unit.

15. The UE of claim 9, wherein when the resource allocation indicates that a second SI window is not configured for the second SI, the computer-executable instructions further causing the processor to:
transmit, via the transceiver, the second MSG1 for the second SI to the BS;
receive, via the transceiver, a second MSG2 from the BS;
determine whether the second MSG2 corresponds to the second MSG1; and
receive, vis that transceiver, the second SI as a unicast message according to the resource allocation in response to determining that the second MSG2 corresponds to the second MSG1.

16. The UE of claim 9, wherein the first MSG2 is determined to correspond to the first MSG1 when the first MSG2 corresponds to the first MSG1 for first SI request and indicates that the first MSG1 for the first SI request is received successfully by the base station.

17. The UE of claim 9, wherein the resource allocation further for indicating a message resource for the first SI transmission, the computer-executable instructions further causing the processor to receive, via the transceiver, the first SI based on the message resource.

\* \* \* \* \*